March 1, 1960 R. C. DISNEY 2,927,160

TELEPHONE ANSWERING DEVICE

Filed April 22, 1958 3 Sheets-Sheet 1

Richard C. Disney
INVENTOR.

BY Clarence A. O'Brien
and Harvey B. Jacobson
Attorneys

March 1, 1960 R. C. DISNEY 2,927,160

TELEPHONE ANSWERING DEVICE

Filed April 22, 1958 3 Sheets-Sheet 2

Richard C. Disney
INVENTOR.

BY Clarence A. O'Brien
and Harvey B. Jacobson
Attorneys

March 1, 1960 R. C. DISNEY 2,927,160

TELEPHONE ANSWERING DEVICE

Filed April 22, 1958 3 Sheets-Sheet 3

Richard C. Disney

INVENTOR.

BY Clarence A. O'Brien and Harvey B. Jacobson

Attorneys

United States Patent Office 2,927,160

Patented Mar. 1, 1960

2,927,160

TELEPHONE ANSWERING DEVICE

Richard C. Disney, McAllen, Tex., assignor of one-half to J. R. Nelson, McAllen, Tex.

Application April 22, 1958, Serial No. 730,090

7 Claims. (Cl. 179—6)

This invention relates to automatic telephone answering equipment and particularly to a device for automatically answering a telephone and transmitting a message to the telephone in response to actuation of the telephone signal.

Prior telephone answering devices are capable of stopping the telephone signal, usually a bell or buzzer, transmitting a message over the telephone and of recording answers to that message. Such prior equipment that has been constructed or described in publications has been quite complex. Due to the expense of construction there has been considerable customer resistance to such equipment. An object of this invention is to provide a telephone answering device that is exceedingly simple in construction. This device can use an ordinary very readily available, and satisfactorily operative automatic record player for transmitting the desired message. Currently a popular record player is manufactured by the Radio Corporation of America and the model or models contemplated are those capable of playing at least 45 r.p.m. records. Patents assigned to the Radio Corporation of America and describing such record players are U.S. Patents Nos. 2,634,135 and 2,706,639 and 2,732,212. These record players are compact and very dependable.

Instead of producing a large number of special components and parts, this invention makes use of record players such as described in these patents and are such as otherwise manufactured. These record players each have among other structures, a tone arm which is caused to move through a single cycle of operation in response to movement of a cycle control structure. This invention has a latching relay whose latch is mechanically connected with the cycle control structure and whose switch section is in an electric circuit that has the turntable motor of the record player, a second relay and an amplifier. The amplifier has its operation controlled by the second relay and has its output connected with the audio input of an ordinary telephone. When the motor starts to operate in the record player, the mechanism of the record player commences a first cycle of operation which consists of the playing of one recording. The signal from the tone arm is amplified by an amplifier which may be battery or otherwise powered and the amplified signal is applied to the telephone audio input thereby causing the signal device of the telephone, usually a bell or buzzer, to stop. At the same time the desired message is being applied to the audio input of the telephone.

Even though the telephone signal device or alarm has been stopped, since the first mentioned relay is a latching relay, the switch section of the latching relay remains closed. All during the playing of the recording, the cycle control structure including the means for lifting and swinging the tone arm, placing it gently on the recording and other structure fulfills its ordinary operation without alteration. However, when the cycle control structure nears the last part of its movement, a reciprocating cycle control slide moves to an extreme position. This movement is transmitted by a structural attachment to the cycle control slide, to the latch of the latching relay in a direction to release the latching relay and enable it to open its switch section thereby opening all of the circuits of the record player and equipment added to the record player to fulfill the telephone answering function of the invention.

Another object of the invention is to provide a telephone answering device that can be constructed at a very low unit cost involving merely a small mechanical motion of the simplest type, an audio amplifier, two conventional relays and a minimum of wiring completing several interdependent circuits. This structure is added to a commercially available automatic record player such as the record players mentioned above or other automatic record players. In contrast to this commercially available equipment for telephone answering has relied on considerably more complex components and considerably greater complexity in the arrangement of parts or in modification of existing record players or in the production of special record players. It is intended that this invention will make available to the general public telephone answering equipment instead of only to businesses. With very small mechanical modification the record player that is used for telephone answering can be switched over to be used as an amusement device (for playing ordinary records). Secondly, the initial cost of the record player fitted with equipment to answer the telephone will not be prohibitive and in fact will be well within reach of the homeowner. He may then leave his home or her home but answer all phone call by a recorded message just as a number of businessmen do at the present time in the pursuits of their businesses, but with much more elaborate apparatus. On the other hand, should a businessman desire to use the comparatively inexpensive but exceedingly dependable equipment in accordance with the invention, he certainly is free to do so.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 3:
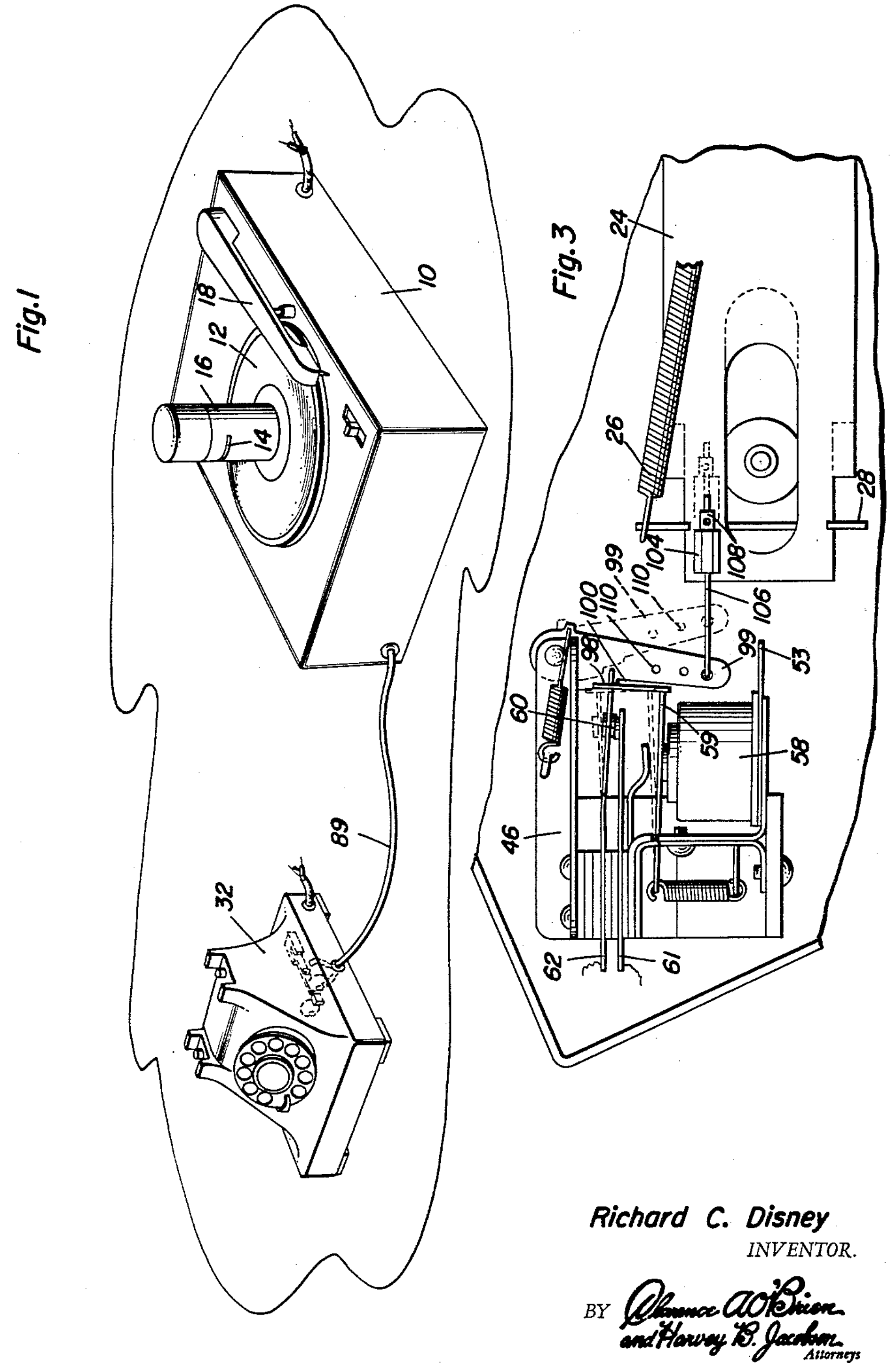
Figure 1 is a perspective view schematically representing an operative connection of a record player that has been modified to convert it to a telephone answering device, the telephone answering device shown connected with a part of a conventional telephone receiver.
Figure 3 is a fragmentary bottom view showing the reciprocating cycle control slide of the cycle control structure of the device in two positions of operation and showing structure which the invention applies to this slide and to the added first relay.

In the accompanying drawings there is an automatic record player 10 of a type that has been identified previously. Although small, neat and compact, record player 10 is fairly complex and for the exact details of structure reference is made to the previously noted patents. In operation of the record player, the turntable 12 rotates, supporting a supply of records have fingers 14 that protrude laterally from spindle 16. These records are dropped one by one onto the turntable, one record being dropped for each cycle of operation of the record player. Tone arm 18 in a single cycle of operation, is lifted by a trip lever assembly 20 (Fig. 2), moved horizontally over the first groove of the record on the turntable 12 and then lowered to the playing position. As the tone arm moves toward spindle 16, the cycle of operation nears its completion at which the reciprocating cycle control structure 22 stops the cycle of operation and causes the return of the tone arm to the rest position shown in Figure 1. The reciprocating control structure 22 has a reciprocating cycle control slide 24 and a control slide return spring 26 with the slide 24 constrained in its movement by guide 28 at the lower part of the automatic record player mechanism.

Telephone 32 is conventional and is mounted with an ordinary connecting block 11 from which a connection can be made in parallel with the audio input for the handset receiving speaker held against the ear of the user of the telephone. Telephone 32 has an alarm 34 which ordinarily is made of a pair of bells 36 and 37 between which clapper 40 is oscillated.

Figure 2:
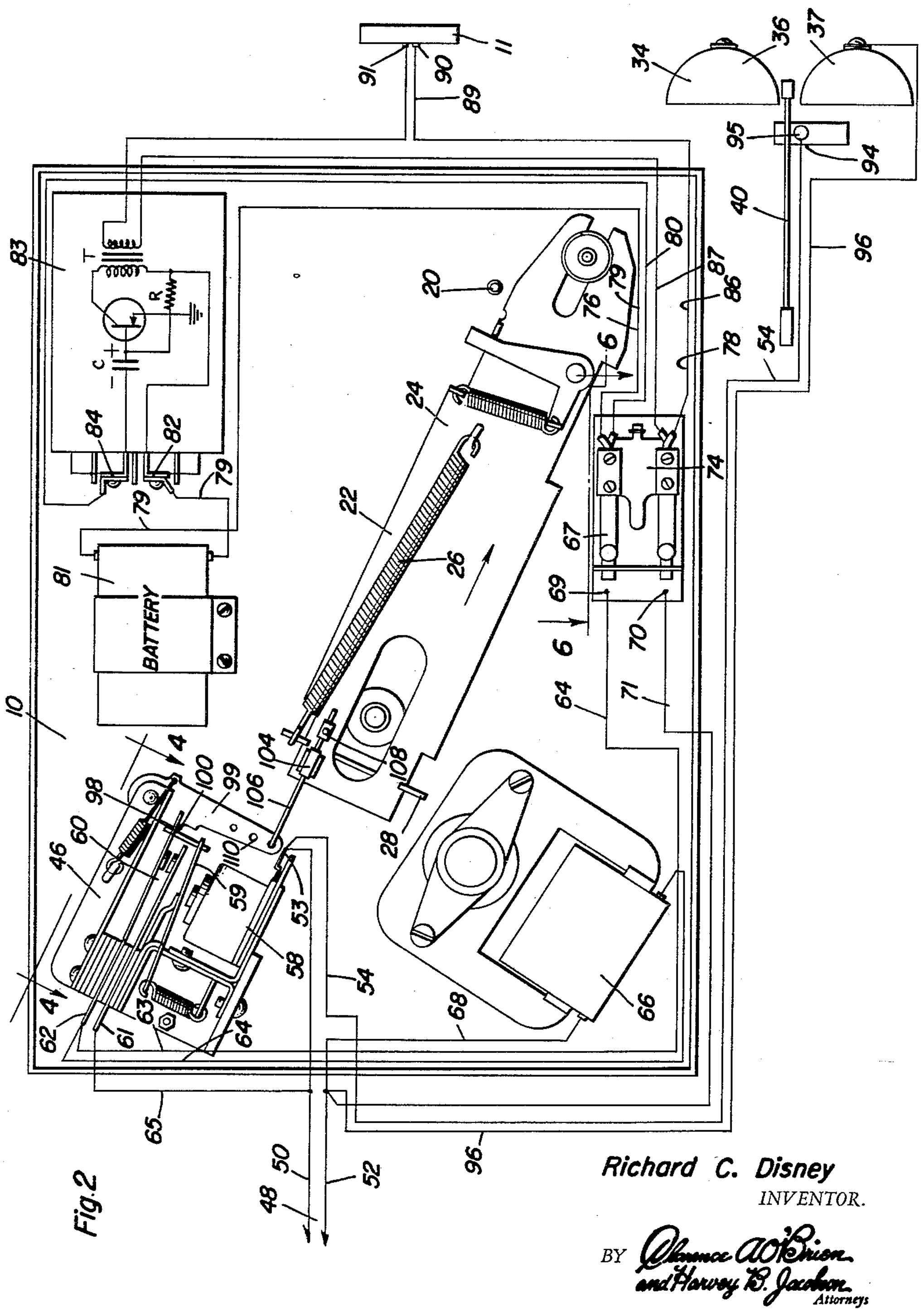
Figure 2 is a bottom view of the device in Figure 1, the wiring shown displaced from its correct location for clarity, this being the complete wiring for the entire apparatus integrated with parts of the record player.
Figure 5:
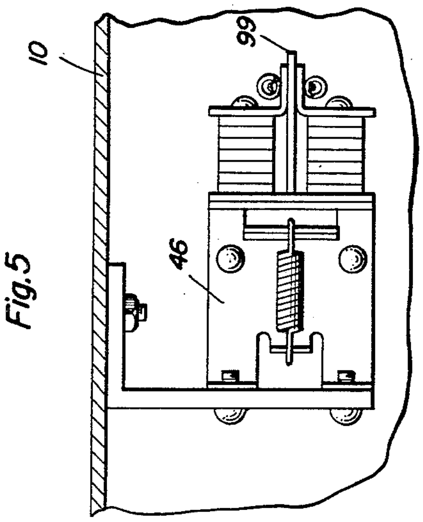
Figure 5 is a view taken along the line 5—5 of Figure 4.
Figure 7:
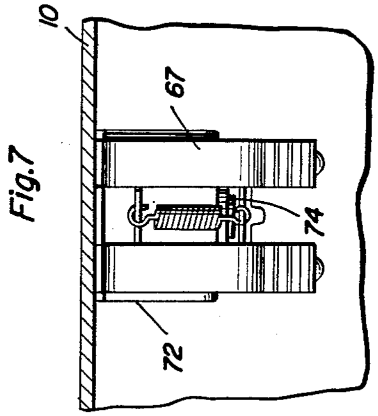
Figure 7 is a view taken on the line 7—7 of Figure 6.
Figure 4:
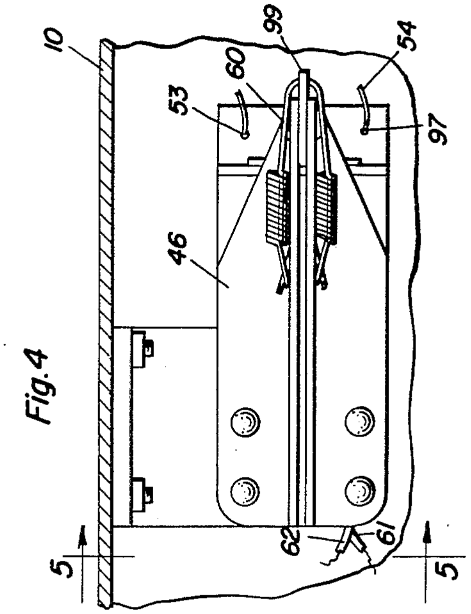
Figure 4 is a sectional view taken on the line 4—4 of Figure 2 and showing principally that two of the wires of Figure 2 are attached to separate terminals for the solenoid of the first relay.
Figure 6:
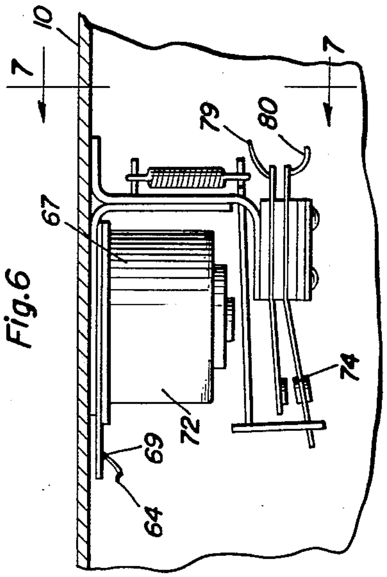
Figure 6 is a view taken on the line 6—6 of Figure 1 and showing the second relay in the circuit of the converted automatic record player.

In the practice of this invention a latching relay 46 is attached to the record player 10. It is preferred that the latching relay and the other structure that is added to the record player, be concealed and therefore Fig. 2 shows relay 46 in the bottom of the record player case. Line cord 48 has two conductors 50 and 52. Conductor 50 is attached to terminal 53 of relay 46 while conductor 54 is attached to terminal 97 of relay 46. These terminals are connected to the winding of solenoid 58 of relay 46 and they energize the solenoid to operate armature 59 thereof. Switch section 60 of relay 46 has two terminals 61 and 62 to which conductors 63, 64 and 65 are respectively secured. Conductor 65 is attached to one side 50 of line 48 while the other two wires 63 and 64 are connected with the record player motor 66 and a second relay 67, respectively. Wire 68 extends from the motor 66 to the opposite side 52 of the line 48. Accordingly, the latching relay switch section 60 controls a circuit having motor 66 and the second relay 67 in it. Terminal 69 of relay 67 has wire 64 connected thereto while terminal 70 of relay 67 is connected by wire 71 to the side 52 of line 48. Terminals 69 and 70 are connected with the solenoid 72 of relay 67 (Fig. 6). Switch section 74 of relay 67 controls two circuits 76 and 78 with the circuit 76 having two conductors 79 and 80 which are connected with battery 81 and through battery 81 to binding post 82 of amplifier 83; and binding post 84 of the amplifier. Accordingly, when the switch section 74 of relay 67 is closed, the amplifier circuit is operative. Circuit 78 has conductors 86 and 87 that extend from the other two contacts of switch section 74 and they form a transmission line 89, conductor 86 extending to a block 11 terminal 90 while conductor 87 extends to the amplifier and then to another terminal 91 of block 11 that is either separably or permanently attached with the previously mentioned audio input of the telephone receiver, ultimately reaching the handset microphone circuit of the telephone receiver.

Briefly, the tone arm 18 cycle is begun when current is applied to record player motor 66. The tone arm moves down on the record and is then free, which causes it to move along the grooves in the record until it reaches the end of the grooves. Then it is cycled back to its original position at which time the latching relay 46 is tripped which disconnects all current. Thereafter the record turntable turns approximately one turn, releasing the tension on the latching relay so it can be latched again when the telephone bell rings.

The amplifier is a single stage, grounded emitter circuit, using a PNP junction transistor. The signal from the phonograph cartridge in tone arm 18 is applied to the input terminals 82 and 84. It is coupled into the base of the transistor by capacitor C. Resistor R supplies the bias to the base of the transistor. The amplified signal is taken from the transistor collector and applied to the primary of transformer T, taken from the output terminals thereof and applied to the telephone circuit. Battery 81 can be a single midget 15 volt zinc-carbon battery.

Switch 94 is mounted in the telephone receiver 32 and uses bell 37 as a part of it. Fixed contact 95, which may be a conductive post, is mounted in the path of oscillations of clapper 40. The clapper must be conductive and mounted in insulation. Wire 96 is attached to bell 37 and to one side 52 of line 48. Wire 54 is attached to post 95 and to the terminal 97 of the latching relay 46. Therefore switch 94 including clapper 40, post 95 and bell 37, is connected in series by conductors 96 and 54, to one side 50 of line 48 and to the solenoid 58 (through terminals 53 and 97) of latching relay 46. Due to the nature of the alarm 34, a short duration pulse is applied to solenoid 58 as soon as the alarm of the telephone is energized, current flowing through the described series circuit that includes switch 94 and a part of latching relay 46, which part is connected across both sides 50 and 52 of line 48.

Continuing with the operation, the closing of the switch section 60 of relay 46 is accomplished by the latching of latch 98 of the latching relay. Latching relay arm 99 is held fast against keeper 100 when the latching relay is latched in this manner. The closing of switch section 60 causes the circuit of motor 66 to be closed thereby starting the record player and this begins a single cycle of operation to play one record. At the same time the solenoid 72 of second relay 67 is energized and this closes the two switch sections that cause the amplifier to be operated. The amplifier is connected with the pick-up in the tone arm 18, accepting the information from the pick-up, amplifying it and transmitting it to transmission line 89, whence the information in the form of an electrical signal is applied to the audio input of the telephone receiver.

As soon as the signal is received in the audio input, the telephone circuitry (by a switch) discontinues the clapper 40 oscillation and this discontinues pulsing of the solenoid 58 in relay 46. While the message is being transmitted (the record on turntable being played) the reciprocating cycle control slide is being moved in the direction of the arrow. There are means connected to this slide 24 and arm 99 for unlatching the latch of the relay 46 at the end of each cycle of operation of the record player. These means consist of a collar 104 that is fixed to a surface of slide 24 and a rod 106 that is passed through said collar so that the collar acts as a guide. This collar also acts as a stop by abutting the adjustable collar 108 or nut on rod 106. The adjustable stop formed by collar or nut 108 is near one end of rod 106 while the other end of the rod 106 is attached in one of the apertures 110 in arm 99. Therefore as the slide 24 moves to the extreme position which is at the end of a cycle of operation of the record player, the two stops, one formed by guide collar 104 and the other formed by nut or collar 108, come into contact with each other. A slight further movement of the slide 22 pulls the arm 99 enough to unlatch it thereby opening switch section 60 and resetting the circuitry so that it is now, again all open and ready for another cycle of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A telephone answering device for a telephone that has an audio input and a bell provided with means to operate the bell and a motor, said answering device comprising the combination with an automatic record player having a tone arm and an associated cycle control structure of; an audio amplifier, a latching relay, means responsive to actuation of said bell operating means for closing and latching said relay, a circuit control by said relay and having said automatic record player motor therein to start a cycle of operation of the record player when said relay is closed for moving said tone arm, means operatively connecting said amplifier with said telephone audio input, and means for releasing said latch relay in response to the movement of said tone arm to a predetermined position.

2. A telephone answering device for a telephone that has an audio input and a bell provided with means to operate the bell and a motor, said answering device comprising the combination with an automatic record player having a tone arm and an associated cycle control structure of; an audio amplifier, a latching relay having a switch section, means responsive to actuation of said bell operating means for latching said relay and thereby closing said switch section, an electric circuit having said latch section as a control element and including the phonograph motor and amplifier and said audio input, the automatic phonograph having a cycle of operation begun with the energization of said motor thereby transmitting a message from the phonograph to the telephone audio input, and mechanical means connected to said cycle control structure and the latch of said relay to unlatch said latch in response to movement of said tone arm to a predetermined position.

3. The answering device of claim 2, wherein said circuit has means for deactivating said bell operating means in response to the closing of said switch section of said relay.

4. In a telephone answering device the combination of an automatic record player which has a tone arm and an associated cycle control structure that operates to discontinue actuation of the record player upon movement of said tone arm to a predetermined position, an amplifier operatively connected with the record player, a transmission line connected with the amplifier and adapted to connect with the audio input of a telephone receiver, means for energizing said amplifier and actuating the record player to commence a single cycle of operation in response to an incoming signal on the telephone, and means responsive to movement of said tone arm to said predetermined position for discontinuing the energization of said amplifier and for stopping the actuation of the record player, the last mentioned means including a latching relay that has a latch which is latched in response to said incoming signal actuated means, and structural members connected with said latch and said tone arm.

5. In a telephone answering device for a telephone that has an alarm with a clapper, an automatic record player having a tone arm, a motor, and a reciprocating cycle control slide to cycle said tone arm, a latching relay which has a latch and a switch section, a switch that is closed in response to actuation of said telephone alarm, conductive means connecting said switch to a source of electrical potential and said latching relay to close said latching relay and cause said latching relay latch to be latched and said switch section of said latching relay to close, means connected with said switch section and the motor of said record player to energize said motor in response to the closing of said latching relay and thereby commence operation of said record player and initiate a single cycle of operation, a second relay operatively connected with said source of electrical potential and said switch section of said first relay so that said second relay is energized when said first relay is closed, an amplifier operatively connected with the tone arm of said record player to receive a signal therefrom, the energization of said amplifier controlled by the closing of said second relay, and a transmission line connected with said amplifier and said second relay and adapted to connect to the audio input of the telephone receiver.

6. In a telephone answering device for a telephone that has an alarm with a clapper, an automatic record player having a tone arm, a motor, and a reciprocating cycle control slide to cycle said tone arm, a latching relay which has a latch and a switch section, a switch that is closed in response to actuation of said telephone alarm, conductive means connecting said switch to a source of electrical potential and said latching relay to close said latching relay and cause said latching relay latch to be latched and said switch section of said latching relay to close, means connected with said switch section and the motor of said record player to energize said motor in response to the closing of said latching relay and thereby commence operation of said record player and initiate a single cycle of operation, a second relay operatively connected with said source of electrical potential and said switch section of said first relay so that said second relay is energized when said first relay is closed, an amplifier operatively connected with the tone arm of said record player to receive a signal therefrom, the energization of said amplifier controlled by the closing of said second relay, and a transmission line connected with said amplifier and said second relay and adapted to connect to the audio input of the telephone receiver, mechanical means connected with said latch of said latching relay and said reciprocating cycle control slide for releasing said latch of said latching relay when the end of said single cycle of operation of said record player is reached at which said latching relay is released and reset thereby opening the circuit with said record player motor and said second relay.

7. In a telephone answering device the combination of an automatic record player which has a cycle control structure that operates to discontinue actuation of the record player upon completion of the playing of one record or a portion of a record, an amplifier operatively connected with the record player, a transmission line connected with the amplifier and adapted to connect with the audio input of a telephone receiver, means for energizing said amplifier and actuating the record player to commence a single cycle of operation in response to an incoming signal on the telephone, and means responsive to movement of said cycle control structure for discontinuing the energization of said amplifier and for stopping the actuation of the record player, the last mentioned means including a latching relay that has a latch which is latched in response to said incoming signal actuated means, and structural members connected with said latch and said cycle control structure, said members including a first stop, a rod, a second stop, one of said stops attached to said rod, the other of said stops attached to said cycle control structure, said rod attached to said latch whereby said stops abut each other and move said rod in response to movement of said cycle control structure and thereby displace said latch to release said latch.

References Cited in the file of this patent

UNITED STATES PATENTS

| | | |
|---|---|---|
| 2,673,241 | Van Deventer | Mar. 23, 1954 |
| 2,769,859 | Zimmermann | Nov. 6, 1956 |